United States Patent
Schmidt

(10) Patent No.: US 7,869,534 B2
(45) Date of Patent: Jan. 11, 2011

(54) METHOD AND APPARATUS FOR CLOCK-PULSE SYNCHRONIZATION WITH AN OFFSET QPSK-MODULATED TRANSMISSION SIGNAL

(75) Inventor: Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 838 days.

(21) Appl. No.: 11/576,238

(22) PCT Filed: Sep. 27, 2005

(86) PCT No.: PCT/EP2005/010436
§ 371 (c)(1), (2), (4) Date: Jul. 25, 2007

(87) PCT Pub. No.: WO2006/034846
PCT Pub. Date: Apr. 6, 2006

(65) Prior Publication Data
US 2007/0263742 A1    Nov. 15, 2007

(30) Foreign Application Priority Data
Sep. 28, 2004 (DE) .................. 10 2004 047 034
Dec. 22, 2004 (DE) .................. 10 2004 061 899

(51) Int. Cl.
*H04L 23/02* (2006.01)
(52) U.S. Cl. .............. 375/262; 375/322; 375/324; 375/329; 375/341; 375/350; 375/354
(58) Field of Classification Search ........... 375/262, 375/341, 350, 322, 324, 329, 354
See application file for complete search history.

(56) References Cited

U.S. PATENT DOCUMENTS

| | | | |
|---|---|---|---|
| 4,313,205 A | 1/1982 | Rhodes | |
| 4,338,579 A | 7/1982 | Rhodes | |
| 5,870,443 A | 2/1999 | Rahnema | |
| 6,560,303 B1 | 5/2003 | Fan et al. | |

(Continued)

FOREIGN PATENT DOCUMENTS

DE    42 23 132 A1    1/1994

(Continued)

OTHER PUBLICATIONS

Kurt Schmidt, "Digitale Taktruckgewinnung fur bandbreiteneffiziente Mobilfunksysteme," 1994, VDI-Verlag GmbH.

*Primary Examiner*—David C Payne
*Assistant Examiner*—Leon Flores
(74) *Attorney, Agent, or Firm*—Ditthavong Mori & Steiner, P.C.

(57) ABSTRACT

An approach is provided for clock-pulse synchronization between an amplitude-modulated or phase-modulated received signal and a transmitted signal by estimating the timing offset between the received signal and the transmitted signal by maximum-likelihood estimation, wherein the maximum-likelihood estimation is realized through a pre-filtering dependent upon the transmission characteristic, a subsequent nonlinear signal-processing function and an averaging filtering. The received signal is an offset quadrature-phase-modulated received signal, and the nonlinear signal-processing function maintains the alternating components in the spectrum of the pre-filtered offset quadrature-phase-modulated received signal.

18 Claims, 6 Drawing Sheets

U.S. PATENT DOCUMENTS

2006/0208786 A1* 9/2006 Pliquett et al. .............. 327/354

FOREIGN PATENT DOCUMENTS

| DE | 690 25 079 T2 | 11/1996 |
| DE | 100 84 108 T1 | 3/2002 |
| EP | 0 486 839 A2 | 5/1992 |
| WO | WO 00/72542 A1 | 11/2000 |
| WO | PCT/EP2005/010436 | 6/2007 |

* cited by examiner

METHOD AND APPARATUS FOR CLOCK-PULSE SYNCHRONIZATION WITH AN OFFSET QPSK-MODULATED TRANSMISSION SIGNAL

FIELD OF THE INVENTION

The invention, according to various embodiments, relates to a method and a apparatus for clock-pulse synchronization with an offset QPSK-modulated transmission signal.

BACKGROUND OF THE INVENTION

When transmitters and receivers are synchronized with one another within a transmission system, the clock-pulse and carrier signal are matched respectively with regard to phase position and frequency at the transmitter end and the receiver end. The clock-pulse synchronization to be considered in the present description requires a clock-pulse recovery in the receiver, which can be realized with or without feedback.

In the case of the clock-pulse recovery with feedback, the clock-pulse phase and frequency are estimated on the basis of the received signal, and a frequency oscillator for phase-synchronous and frequency-synchronous sampling of the received signal is post-tuned at the correct inter-symbol interference-free decision timing points.

By contrast, in the case of a feedback-free clock-pulse recovery, the clock-pulse phase and frequency are estimated on the basis of the received signal sampled with a fixed sampling frequency, and the correct symbol value of the received signal at the respective decision timing point is determined via an interpolator from the sampled values, which are adjacent to the respective inter-symbol interference-free decision timing points.

For the feedback-free clock-pulse recovery with a fixed clock-frequency, which is known to the receiver, a method for pulse amplitude modulated (PAM), quadrature-phase-modulated (QPSK) and π/4 quadrature-phase-modulated (π/4-QPSK) signals based on the maximum-likelihood estimation is detailed in K. Schmidt: "Digital clock-pulse recovery for bandwidth-efficient mobile telephone systems", 1994, ISBN 3-18-14 7510-6.

In this context, the maximum-likelihood estimation is based upon a maximisation of the likelihood function, which, via an inverse exponential function, minimizes the modulus error squared between the measured, noise-contaminated received signal and a model, ideal, noise-free transmission signal containing the desired timing offset over an observation period. The desired timing offset is obtained, when the model transmission signal approximates the measured receiver signal with minimal modulus error squared.

As shown in detail in the K. Schmidt article and below, the likelihood function is obtained from the received signal, convoluted with the impulse response of a signal-matched pre-filter, which is subjected, after pre-filtering, to a nonlinear function and then averaged over a limited number of symbols. As also shown by the K. Schmidt article, the nonlinear function can be approximated by a modulus squaring. If the timing offset is determined in the time domain, the desired timing offset is obtained from a maximum detection of the pre-filtered, modulus-squared and averaged received signal, which corresponds to the maximum-likelihood function.

The disadvantage of an inaccurate or ambiguous maximum detection in the time domain resulting from inadequate removal of interference in the useful signal can be avoided by observation in the frequency domain. A determination of the timing offset in the frequency domain, exploits the fact that the pre-filtered, modulus-squared received signal averaged over a limited number of symbols provides a basic periodicity over the symbol length and respectively a maximum at multiples of the symbol length. The timing offset can therefore be determined according to a discrete Fourier transformation of the pre-filtered, modulus-square received signal averaged over a given number of symbols from the phase of the spectral line at the basic spectral frequency determined by the symbol frequency.

The frequency-domain-orientated determination of the timing offset outlined above, which presupposes a spectral line corresponding to a periodized received signal, fails in the case of an offset quadrature-phase-shift keying (OQPSK) modulated signal. As a result of the modulus squaring, the in-phase and quadrature components of the pre-filtered offset-QPSK-received signal, phase-offset by one symbol length, cancel each other out with regard to their alternating component and lead to a time signal, which provides substantially only a direct component and therefore no spectral lines containing the timing offset.

SUMMARY OF THE INVENTION

There exists a need for providing a method and a device for determining the timing offset in the frequency domain for the clock-pulse synchronization of an Offset Quadrature Phase Shift Keying (OQPSK) signal.

In accordance with one embodiment of the present invention, a method is provided for clock-pulse synchronization with an offset-QPSK signal with the features of claim 1 and by a device for clock-pulse synchronization with an offset-QPSK signal with the features according to claim 12. Advantageous further developments of the invention are specified in the dependent claims.

Instead of the modulus squaring, the method according to an exemplary embodiment of the present invention and the device according to an exemplary embodiment of the invention include a squaring without modulus formation as a nonlinear signal-processing function and respectively as a nonlinear signal-processing unit. In this manner, the alternating components of the in-phase and quadrature components of the pre-filtered offset-QPSK receiver signal are constructively superposed and lead to spectral lines, which can be identified by the subsequent discrete Fourier transformation and supplied for subsequent spectral processing in order to determine the timing offset.

In accordance with one embodiment of the present invention, the discrete Fourier transformation is evaluated on the pre-filtered, squared received signal averaged over a given number of symbols only at the positive and negative symbol frequency. The higher-value spectral lines occurring periodically at the symbol frequency need not be taken into consideration, because, in the case of a Nyquist system with non-linearity, no further harmonics are present.

The carrier-frequency synchronization to be implemented alongside the clock-pulse synchronization on the received signal can be disposed in cascade upstream or downstream of the clock-pulse synchronization. If the carrier-frequency synchronization according to an exemplary embodiment of the invention is connected downstream of the clock-pulse synchronization, the pre-filtered, squared received signal averaged over a given number of symbols is compensated in order to achieve a correct determination of the timing offset of the clock pulse by comparison with a carrier-frequency and carrier-phase offset, which may occur in the received signal. For this purpose, the Fourier transform of the received signal is conjugated at the positive symbol frequency and then multiplied by the Fourier transform at the negative symbol frequency.

Since, in the carrier-frequency-offset-influenced operational case, the spectral lines in the carrier-frequency-offset-free received signal come to be disposed at the positive and negative symbol frequency, frequency-displaced relative to the positive or respectively negative symbol frequency in each case by the carrier-frequency offset, the averaging filtering should be subdivided into a first averaging filtering and a second averaging filtering following the first averaging filtering. The pass range of the first averaging filtering in this context should be designed so that the spectral line, frequency-displaced by the carrier-frequency offset by comparison with the positive or respectively negative symbol frequency, is captured by the first averaging filtering. The mid-frequencies of the first averaging filtering, realized as a Dirac comb in the time domain and correspondingly as a periodically-repeated Si function in the frequency domain, are therefore disposed respectively at multiples of the symbol frequency and provide a bandwidth, which corresponds to the maximum anticipated carrier-frequency offset. The long averaging length required for an optimum averaging of the pre-filtered and squared received signal, which accordingly determines a narrow-band averaging filtering and therefore opposes the bandwidth-expanded first averaging filtering, is realized by the second averaging filtering, of which the averaging length is a multiple of the averaging length of the first averaging filtering and is therefore designed to be of a substantially narrower band than the first averaging filtering.

In a first embodiment of the method according to an exemplary embodiment of the invention for clock-pulse synchronization with an offset-QPSK signal and the device according to an exemplary embodiment of the invention for clock-pulse synchronization with an offset QPSK signal, the first averaging filtering is implemented after the squaring, while the second averaging filtering, following the first averaging filtering, is provided after the discrete Fourier transformation and conjugation or respectively multiplication of the Fourier transform localised at the positive and negative symbol frequency.

In a second embodiment of the method according to an exemplary embodiment of the invention for clock-pulse synchronization with an offset QPSK signal and the device according to an exemplary embodiment of the invention for clock-pulse synchronization with an offset QPSK signal, the first averaging filtering is implemented in each case following the discrete Fourier transformation or respectively conjugation, and the second averaging filtering is implemented after multiplication of the two Fourier transforms respectively averaged with the first averaging filtering and localised at the positive or respectively negative symbol frequency.

The pre-filtering is preferably realized as a signal-matched filter and therefore achieves maximum signal-noise spacing.

Exemplary embodiments of the method for clock-pulse synchronization of the offset QPSK signal according to an exemplary embodiment of the invention and the device according to an exemplary embodiment of the invention for the clock-pulse synchronization of the offset QPSK signal are described in greater detail in the following section with reference to the drawings.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE PREFERRED EMBODIMENTS

Before describing the various embodiments of the present invention, a derivation of the required mathematical principles will be presented in the following section.

In this context, in a first stage, clock-pulse synchronization by means of the maximum-likelihood estimation in the case of a Quadrature Phase Shift Keying (QPSK) signal is presented as a conventional approach. The knowledge gained in this context will then be transferred to the clock-pulse synchronization in the case of an offset QPSK signal.

Figure 1:
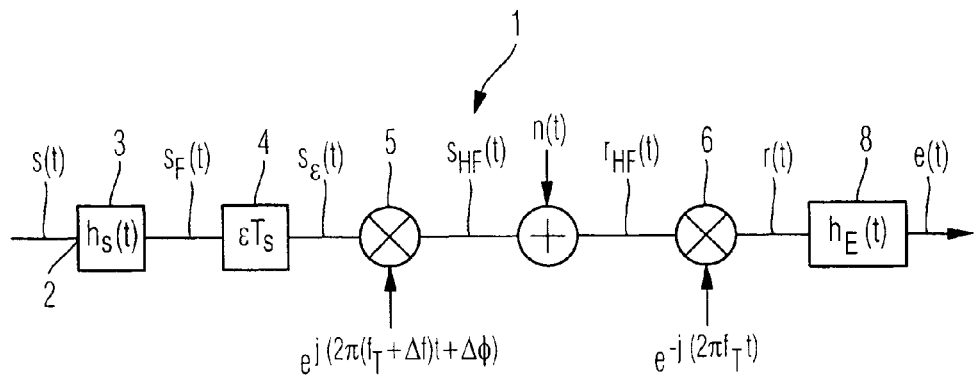
FIG. 1 shows an expanded block-circuit diagram of the transmission system, according to an exemplary embodiment.

The starting point is a complex baseband model of a transmission system 1 for time-continuous complex signals, for which an expanded block circuit diagram is shown in FIG. 1.

The complex symbol sequence s(t) of a PAM-, QPSK- or π/4-QPSK-signal to be transmitted is supplied to the input 2 of the transmission system 1 according to equation (1):

$$s(t) = \sum_{n=-\infty}^{+\infty} a_R(n) \cdot \delta(t - nT_S) + j \cdot \sum_{n=-\infty}^{+\infty} a_I(n) \cdot \delta(t - nT_S) \tag{1}$$

In this context, $a_R(n)$ and $a_I(n)$ represent the symbol values for the in-phase and quadrature components of the PAM-, QPSK- or π/4-QPSK-transmission signal to be generated, which can, for example, adopt the real values {+/−$s_i$} of the symbol alphabet. The symbol sequences of the in-phase and quadrature component are periodic in each case with respect to the symbol length $T_s$. In terms of system theory, the symbol sequence s(t) to be transmitted is convoluted in the transmitter filter 3 with its impulse response $h_s(t)$ and supplies a filtered symbol sequence $s_F(t)$ at the output of the transmitter filter 3 as shown in equation (2):

$$s_F(t) = \sum_{n=-\infty}^{+\infty} a_R(n) \cdot h_S(t - nT_S) + j \cdot \sum_{n=-\infty}^{+\infty} a_I(n) \cdot h_S(t - nT_S) \quad (2)$$

The subsequent lag element 4 models the time offset $\epsilon \cdot T_s$ occurring as a result of absent or inadequate synchronization between the transmitter and the receiver, which is derived from the timing offset $\epsilon$ to be determined by the method according to an exemplary embodiment of the invention or the device according to an exemplary embodiment of the invention. The timing offset $\epsilon$ in this context can adopt positive and negative values typically between ±0.5. The filtered symbol sequence $s_\epsilon(t)$ taking into consideration the timing offset $\epsilon \cdot T_s$ at the output of the lag element 4 is accordingly obtained as shown in equation (3):

$$s_\epsilon(t) = \sum_{n=-\infty}^{+\infty} a_R(n) \cdot h_S(t - \epsilon T_S - nT_S) + j \cdot \sum_{n=-\infty}^{+\infty} a_I(n) \cdot h_S(t - \epsilon T_S - nT_S) \quad (3)$$

The lag-influenced, filtered symbol sequence $s_\epsilon(t)$ is mixed in an offset-QPSK-modulator—modelled in FIG. 1 as a multiplier 5—with a complex carrier signal $e^{j(2\pi(f_T+\Delta f)t+\Delta\phi)}$ to form a PAM-, QPSK- or π/4-QPSK-modulated transmission signal $S_{HF}(t)$. The carrier signal $e^{j(2\pi(f_T+\Delta f)t+\Delta\phi)}$ provides a carrier frequency $f_T$, which provides a frequency offset $\Delta f$ and phase offset $\Delta\phi$ as a result of the absence of carrier-frequency synchronization. Ignoring signal errors of the quadrature modulator, for example, carrier-signal crosstalk on the in-phase or quadrature channel, gain imbalance between the in-phase and quadrature channel, quadrature error between the in-phase and the quadrature channel, the mathematical relationship shown in equation (4) is obtained for the PAM-, QPSK- or π/4-QPSK-modulated transmission signal $s_{HF}(t)$:

$$s_{HF}(t) = \begin{bmatrix} \sum_{n=-\infty}^{+\infty} a_R(n) \cdot h_S(t - \epsilon T_S - nT_S) + \\ j \cdot \sum_{n=-\infty}^{+\infty} a_I(n) \cdot h_S(t - \epsilon T_S - nT_S) \end{bmatrix} \cdot e^{j(2\pi(f_T+\Delta f)t+\Delta\phi)} \quad (4)$$

On the transmission path between the transmitter and receiver, an additive white Gaussian noise (AWGN) n(t), which, according to equation (5) provides a real and imaginary component $n_R(t)$ and $n_I(t)$, is superposed additively on the PAM-, QPSK- or π/4-QPSK-modulated transmission signal $s_{HF}(t)$ $$n(t) = n_R(t) + j \cdot n_I(t) \quad (5)$$

The received signal $r_{HF}(t)$ received by the receiver is therefore obtained according to equation (6):

$$r_{HF}(t) = s_{HF}(t) + n(t) \quad (6)$$

In the receiver, the PAM-, QPSK- or π/4-QPSK received signal $r_{HF}(t)$ with superposed noise n(t) is mixed down into the baseband in a demodulator—modelled in FIG. 1 as a multiplier 6—with the carrier signal $e^{-j2\pi f_T t}$. The demodulated received signal r(t) at the output of the demodulator 6, which contains an in-phase and quadrature symbol sequence distorted with the frequency and phase offset of the carrier signal, is obtained according to equation (7):

$$r(t) = s_\epsilon(t) \cdot e^{j2\pi\Delta f+\Delta\varphi} + n(t) \quad (7)$$

$$= \begin{bmatrix} \sum_{n=-\infty}^{+\infty} a_R(n) \cdot h_S(t - \epsilon T_S - nT_S) + \\ j \cdot \sum_{n=-\infty}^{+\infty} a_I(n) \cdot h_S(t - \epsilon T_S - nT_S) \end{bmatrix} \cdot e^{j(2\pi\Delta ft+\Delta\varphi)} + n(t)$$

Figure 2:
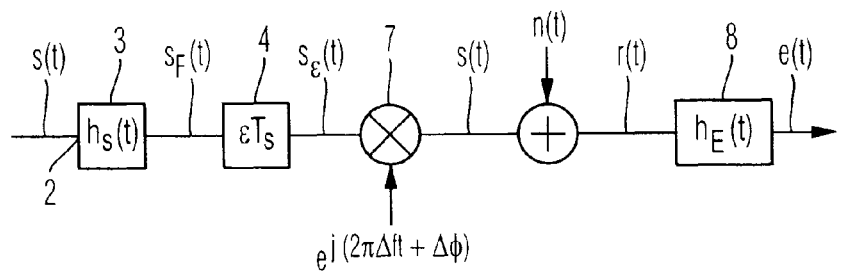
FIG. 2 shows a reduced block-circuit diagram of the transmission system, according to an exemplary embodiment.

As shown in equation (7), the system-theoretical effects of the modulator 5 and the demodulator 6 of the transmission system 1 on the PAM-, QPSK- or π/4-QPSK-signal are partially cancelled out, so that the modulator 5 and the modulator 6 in FIG. 1 can be replaced by a single multiplier 7 according to the reduced block-circuit diagram shown in FIG. 2, which mixes the lag-influenced, filtered symbol sequence $\epsilon \cdot T_s$ with a signal $e^{j(2\pi(f_T+\Delta f)t+\Delta\phi)}$ according to equation (8) to form a transmitted signal $s_{NF}(t)$ in the baseband.

$$s_{NF}(t) = \begin{bmatrix} \sum_{n=-\infty}^{+\infty} a_R(n) \cdot h_S(t - \epsilon T_S - nT_S) + \\ j \cdot \sum_{n=-\infty}^{+\infty} a_I(n) \cdot h_S(t - \epsilon T_S - nT_S) \end{bmatrix} \cdot e^{j(2\pi ft+\Delta\varphi)} \quad (8)$$

According to the reduced block circuit diagram in FIG. 2, the transmitted signal s(t) with the superposed additive white Gaussian noise n(t) is received by the receiver as the received signal r(t), which corresponds to the received signal according to equation (7) of the expanded block circuit diagram according to FIG. 1.

The received signal r(t) is convoluted in the receiver filter 8 according to equation (9) with the associated impulse response $h_E(t)$ and leads to the signal e(t) at the output of the receiver filter 8, which represents an in-phase and quadrature symbol sequence filtered and distorted with regard to signal error and frequency and phase offset:

$$e(t) = r(t) * h_E(t) \quad (9)$$

In the case of a PAM-, QPSK- or π/4-QPSK-signal, the K. Schmidt article discloses a method based on the maximum-likelihood estimation for determining the timing offset $\epsilon$ in the clock-pulse synchronization, which represents the conventional approach, and which is necessary for an understanding of the method according to an exemplary embodiment of the invention and the device according to an exemplary embodiment of the invention for clock-pulse synchronization with an offset-QPSK-signal. This method will therefore be described in the following section.

According to the K. Schmidt article, the conditional likelihood function $L(\epsilon|\underline{u})$ dependent upon the timing offset $\epsilon$ and the symbol values $\underline{u} = [u_0, \ldots, u_N]^T$ transmitted in the observation period $T_0$ is described according to equation (10) as the modulus-error squared integrated over the observation period between the captured, noise-contaminated received signal r(t)

and the ideal, noise-free modelled transmission signal $\bar{s}(t)$ influenced with the desired timing offset $\epsilon$.

$$L(\varepsilon \mid \underline{u}) = e^{-\frac{1}{N_0} \int_{T_0} |r(t) - \bar{s}(t,\underline{u},\varepsilon)|^2 dt} \qquad (10)$$

$$= e^{-\frac{1}{N_0} \int_{T_0} |r^2(t) - 2r(t)\bar{s}(t,\underline{u},\varepsilon) + \bar{s}^{-2}(t,\underline{u},\varepsilon)|^2 dt} \leq 1$$

The use of the inverted exponential function and the division of the argument of the exponential function by the noise-power density $N_0$ and the observation period $T_0$ leads to a scaling of the conditional likelihood function $L(\epsilon|\underline{u})$ to values less than one. In order to neutralize the likelihood function $L(\epsilon)$ with regard to the symbol values $\underline{u}$ transmitted in the time interval $T_0$, the conditional likelihood function $L(\epsilon|\underline{u})$ is linked, according to equation (11), over the observation period $T_0$ with the composite density of distribution function $p_{\underline{a}}(\underline{u})$, which describes the probability of occurrence of the symbol values $\underline{u}$ transmitted in the time interval $T_0$ within the symbol alphabet $\underline{a}$.

$$L(\varepsilon) = \int_{\underline{u}} L(\varepsilon \mid \underline{u}) \cdot p_{\underline{a}}(\underline{u}) d\underline{u} \qquad (11)$$

In principle, the maximum-likelihood estimation can be implemented, within the framework of a simplified model of the clock-pulse recovery, via a limited number of symbols in an infinitely long observation period $T_0$ or, within the framework of a more realistic model of clock-pulse recovery, via an unlimited number of symbols in a limited observation period $T_0$. The simplified model is presented in the following section. In this case, an integration of the modulus-error squared over an infinite integration period according to equation (12) is obtained for the mathematical relationship of the conditional likelihood function $L(\epsilon|\underline{u})$ in equation (10):

$$L(\varepsilon \mid \underline{u}) = e^{-\frac{1}{N_0} \int_{-\infty}^{+\infty} |r^2(t) - 2r(t)\bar{s}(t,\underline{u},\varepsilon) + \bar{s}^{-2}(t,\underline{u},\varepsilon)|^2 dt} \qquad (12)$$

The following considerations apply for the individual terms in the integral of the conditional likelihood function $L(\epsilon|\underline{u})$ shown in equation (12):

Since the term for the squared received signal $r^2(t)$ is independent of the timing offset $\epsilon$, this term can be placed before the exponential function as a constant.

With a limited number N of symbols, the modelled transmitted signal $\bar{s}(t,\underline{u},\epsilon)$ according to equation (13) is described, by way of deviation from equation (3), as a Dirac comb, linked multiplicatively with the symbol duration $T_s$ and the symbol values $u_v$, which is convoluted with the impulse response $h_s(t)$ of the transmitter filter 3.

$$\bar{s}(t, \underline{u}, \varepsilon) = \sum_{n=0}^{N-1} u_v \cdot T_S \cdot h_S(t - \varepsilon T_S - nT_S) \qquad (13)$$

Taking into consideration the scaling of the transmitter filter 3 presented in equation (14), the mathematical relationship described in equation (15) is obtained for the integral of the squared, modelled transmission signal $\bar{s}^2(t,\underline{u},\epsilon)$.

$$T_S \cdot h_S(0) = \int_{-\infty}^{+\infty} T_S \cdot h_S^2(t) dt = 1 \qquad (14)$$

$$\int_{-\infty}^{+\infty} \bar{s}^2(t, \underline{u}, \varepsilon) dt = \int_{-\infty}^{+\infty} \sum_{n=0}^{N-1} T_S^2 \cdot u_v^2 \cdot h_S^2(t - \varepsilon T_S - nT_S) \qquad (15)$$

$$= \sum_{n=0}^{N-1} T_S \cdot u_n^2$$

The mathematical relationship in equation (16) is obtained for the integral of the product of the received signal and the modelled transmission signal $r(t) \cdot \bar{s}(t,\underline{u},\epsilon)$:

$$\int_{-\infty}^{+\infty} r(t) \cdot \bar{s}(t, \underline{u}, \varepsilon) dt = \int_{-\infty}^{+\infty} r(t) \cdot \sum_{n=0}^{N-1} T_S \cdot u_n \cdot \qquad (16)$$

$$h_S(t - \varepsilon T - nT_S) dt =$$

$$= \sum_{n=0}^{N-1} T_S \cdot u_n \cdot \int_{-\infty}^{+\infty} r(t) \cdot$$

$$h_S(t - \varepsilon T_S - nT_S) dt =$$

$$= \sum_{n=0}^{N-1} T_S \cdot u_n \cdot [r(nT_S + \varepsilon T_S) *$$

$$h_S(-nT_S - \varepsilon T_S)]$$

$$= \sum_{n=0}^{N-1} T_S \cdot u_n \cdot e(nT_S + \varepsilon T_S)$$

In the last stage of equation (16), the mathematical relationship of the receiver filter 8 in equation (9) is taken into consideration, as is the fact, which will be explained in greater detail below, that the receiver filter 8 is a signal-matched filter with the impulse response $h_E(t) = h_s(-t)$.

If the knowledge determined above is now taken into consideration for the mathematical terms of the integral of the conditional likelihood function $L(\epsilon|\underline{u})$ in equation (12), the mathematical relationship according to equation (17) is obtained for the conditional likelihood function $L(\epsilon|\underline{u})$:

$$L(\varepsilon \mid \underline{u}) = const \cdot e^{-\frac{T}{N_0} \sum_{n=0}^{N-1} [u_n^2 - 2u_n e(nT_S + \varepsilon T_S)]} = \qquad (17)$$

$$const \cdot \prod_{n=0}^{N-1} e^{-\frac{T_S}{N_0}(u_n^2 - 2u_n e(nT_S + \varepsilon T_S))}$$

Because of the statistically-independent occurrence of the individual symbols $a_n$, equation (18) applies for the composite density of distribution function $p_{\underline{a}}(\underline{u})$:

$$p_{\underline{a}}(\underline{u}) = \prod_{n=0}^{N-1} p_{a_n}(u_n) \qquad (18)$$

The mathematical relationship shown in equation (19), which is transferred into the corresponding mathematical relationship for the log-likelihood function l(ε) in equation (20) by the introduction of the log-likelihood function l(ε)=ln (L(ε)), is therefore obtained:

$$L(\varepsilon) = const \cdot \int_{-\infty}^{+\infty} \prod_{n=0}^{N-1} e^{-\frac{T_S}{N_0}(u_n^2 - 2u_n e(nT_S + \varepsilon T_S))} \cdot p_{a_n}(u_n) du_n \quad (19)$$

$$l(\varepsilon) = \quad (20)$$
$$const \cdot \sum_{n=0}^{N-1} \ln\left(\int_{-\infty}^{+\infty} e^{-\frac{T_S}{N_0}(u_n^2 - 2u_n e(nT_S + \varepsilon T_S))} \cdot p_{a_n}(u_n) du_n\right)$$

As shown in equation (20), the log-likelihood function l(ε) can be interpreted from a filtering of the received signal r(t) with a signal-matched input filter—signal e(nT$_s$+εT$_s$)—non-linear signal processing—$e^{-x}$ function, integration, logarithm function—and averaging—summation.

The nonlinear signal-processing function can be approximated by a modulus squaring, as shown in the K. Schmidt article.

Figure 3:
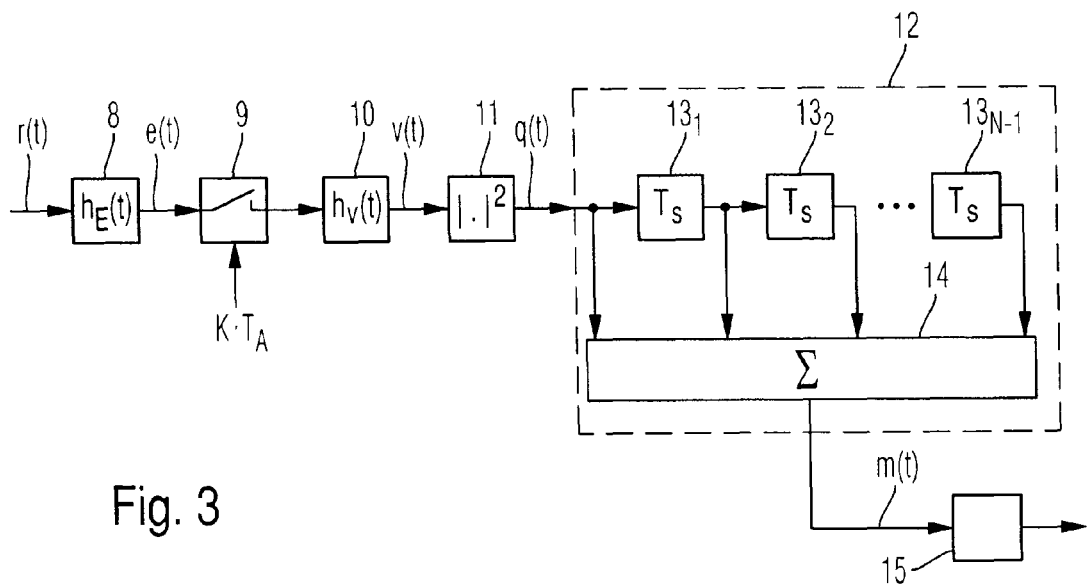
FIG. 3 shows a conventional block-circuit diagram of the device for clock-pulse synchronization.

Accordingly, the block-circuit diagram shown in FIG. 3 for a device for determining the timing offset ε in the clock-pulse synchronization of a PAM-, QPSK- or π/4-QPSK-signal on the basis of a maximum-likelihood estimation, which represents the conventional approach, is obtained.

The received signal r(t) is filtered by the receiver filter 8 with the impulse response h$_E$(t) and provides at its output the filtered received signal e(t). The receiver filter 8 is a signal-matched filter. According to equation (21), a signal-matched filter provides an impulse response h$_E$(t) corresponding to the impulse response h$_s$(t) of the transmitter filter 3 and, correspondingly, according to equation (22), a transmission function H$_E$(f) reflected relative to the transmission function H$_s$(f).

$$h_E(t) = h_s(-t) \quad (21)$$

$$H_E(f) = H_s(-f) \quad (22)$$

In this manner, the signal-noise spacing of the filtered receiver signal e(t) is maximized as a ratio of the useful power to the interference power.

Following the receiver filter 8, a sampling of the filtered receiver signal is implemented in a sampling and holding element 9, with a sampling rate f$_A$, which is increased by comparison with the symbol frequency f$_s$ of the received signal r(t) by the oversampling factor os. The oversampling factor os in this context must have a value of at least 8, because, with a roll-off factor r of one (r=1) of the receiver filter 8, the frequency spectrum of the filtered received signal e(t) provides frequency components less than or equal to the symbol frequency –|f|≦f$_s$—the bandwidth of the signal is doubled through the subsequent modulus squaring, which corresponds to a convolution in the frequency domain, and another multiplication of the signal takes place subsequently, which once again doubles the bandwidth of the signal.

After the sampling of the filtered received signal e(t), another pre-filtering of the signal is implemented in a pre-filter 10. The pre-filter 10 has the object of minimizing data-dependent jitter in the signal. For this purpose, as explained in detail in the K. Schmidt article, the frequency spectrum H$_E$(f) of the receiver filter 8 is linked multiplicatively to the frequency spectrum H$_V$(f) of the pre-filter 10 according to equation (23) to form a common frequency spectrum H$_{EV}$(f)

$$H_{EV}(f) = H_E(f) \cdot H_V(f) \quad (23)$$

Figure 4A:
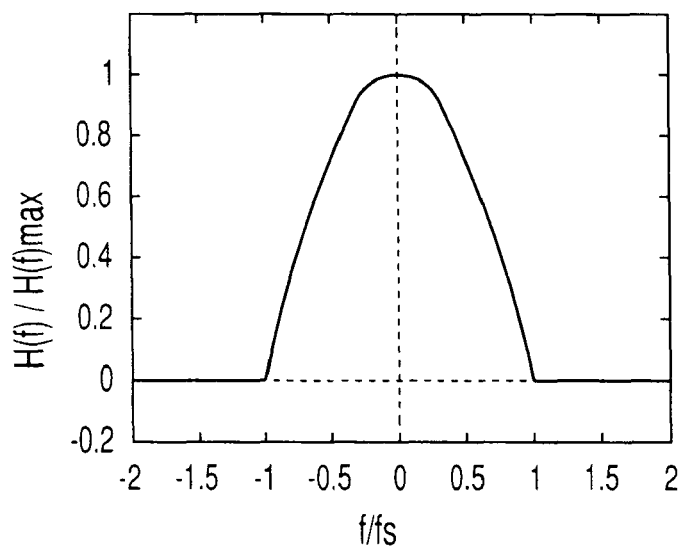
FIGS. 4A, 4B show a frequency response of the transmission filter with a roll-off factor of 1 and 0.5, according to an exemplary embodiment.
Figure 4B:
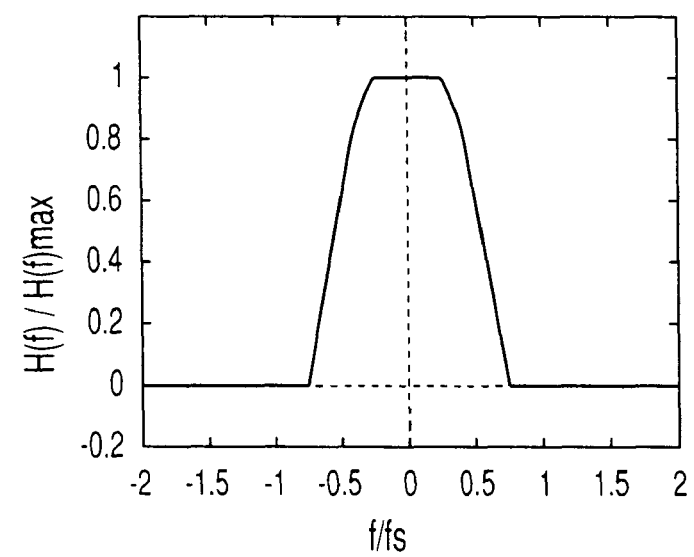

If the transmitter filter according to equation (24) provides a frequency spectrum H$_s$(f), which corresponds to a root-cosine filter with a roll-off factor r, the common frequency spectrum H$_{EV}$(f) of the receiver filter 8 and of the pre-filter 10, as derived in detail in the K. Schmidt article, is interpreted according to equation (25) dependent upon the frequency spectrum H$_s$(f) of the transmitter filter 3, in order to minimize data-dependent jitter in the receiver signal r(t).

$$H_S(f) = \begin{cases} 1 \\ \cos\left[\frac{\pi|f|}{2rf_s} - \frac{\pi(1-r)}{4r}\right] \\ 0 \end{cases} \quad (24)$$

for $|f| < \frac{f_s}{2}$ for $(1-r)\frac{f_s}{2} < |f| \leq (1+r)\frac{f_s}{2}$ for $(1+r)\frac{f_s}{2} < |f|$ $$H_{EV}(f) = \begin{cases} H_S(f - f_s) + H_S(f + f_s) \\ \text{random} \\ 0 \end{cases} \quad (25)$$

for $|f| \leq \frac{f_s}{2}(1+r)$ for $\frac{f_s}{2}(1+r) < |f| \leq f_s$ for $f_s < |f|$ The frequency response H$_s$(f) of the transmitter filter 3 is presented in FIG. 4A for a roll-off factor r of 1, and in FIG. 4B for a roll-off factor of 0.5. The frequency response H$_{GES}$(f)= H$_s$(f)·H$_{EV}$(f) of the overall transmission system consisting of the transmitter filter 3, receiver filter 8 and pre-filter 10, is presented for a roll-off factor r of 1 in FIG. 4C and for a roll-off factor r of 0.5 in FIG. 4D.

Figure 4C:
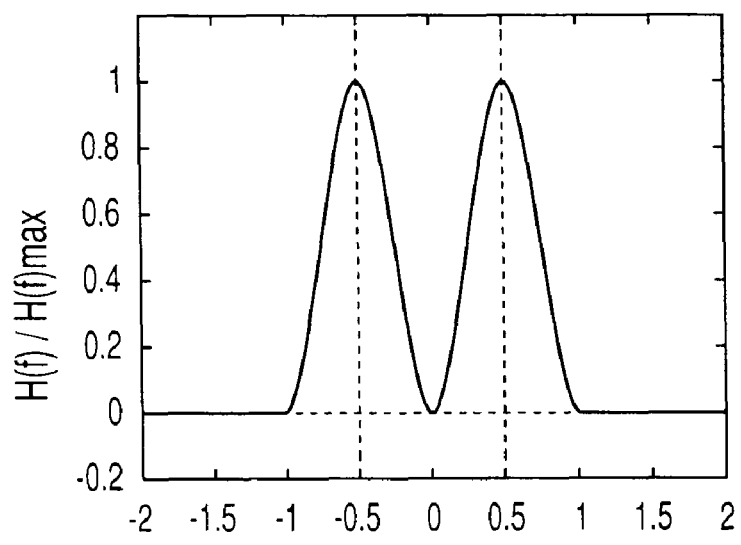
FIGS. 4C, 4D show a frequency response of the overall transmission path with a roll-off factor of 1 and 0.5, according to an exemplary embodiment.
Figure 4D:
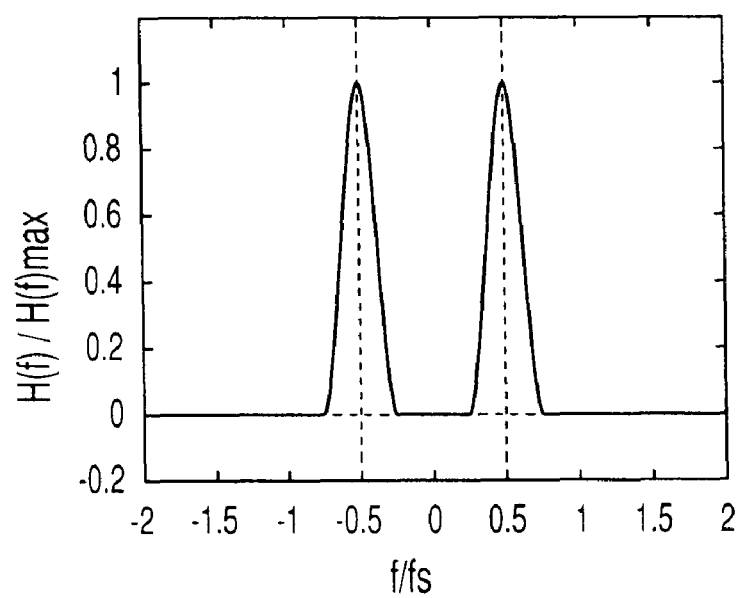

If the frequency response H$_{GES}$(f) in FIG. 4C or FIG. 4D is considered, this frequency response can be interpreted according to equation (26) as a low-pass filter H$_{GES0}$(f) symmetrical about the frequency f=0 with the bandwidth of $$\frac{f_s}{2} \cdot r,$$

which is frequency displaced in each case by $$\pm \frac{f_s}{2}:$$

$$H_{GES}(f) = H_{GES0}(f) * \left(\delta\left(f - \frac{f_s}{2}\right) + \delta\left(f + \frac{f_s}{2}\right)\right) = \quad (26)$$
$$= H_{GES0}\left(f - \frac{f_s}{2}\right) + H_{GES0}\left(f + \frac{f_s}{2}\right)$$

The corresponding impulse response h$_{GES}$(t) is therefore obtained according to equation (27):

$$h_{GES}(t) = h_{GES0}(t) \cdot \left(e^{j2\pi\frac{f_s}{2}t} + e^{-j2\pi\frac{f_s}{2}t}\right) \quad (27)$$
$$= h_{GES0}(t) \cdot \cos\left(2\pi\frac{f_s}{2}t\right)$$

The signal v(t) at the output of the pre-filter 10 can therefore be obtained according to equation (28) by replacing the impulse response h$_s$(t) of the transmitter filter 3 with the impulse response $h_{GES}(t)$ of the overall transmission system in the transmitted signal $S_{NF}(t)$ in the baseband, as shown in equation (8):

$$v(t) = s_{NF}(t) * h_{GES}(t) = \qquad (28)$$

$$\left[ \sum_{n=-\infty}^{+\infty} a_R(n) \cdot h_{GES}(t - \varepsilon T_S - nT_S) + j \cdot \sum_{n=-\infty}^{+\infty} a_I(n) \cdot h_{GES}(t - \varepsilon T_S - nT_S) \right] \cdot e^{j(2\pi \Delta f t + \Delta \varphi)}$$

With reference to equation (27), the impulse response $h_{GES}(t-\varepsilon T_s-nT_s)$ can be described according to equation (29):

$$h_{GES}(t - \varepsilon T_S - nT_S) = h_{GES0}(t - \varepsilon T_S - nT_S) \cdot \qquad (29)$$

$$(-1)^n \cdot \cos\left(2\pi \frac{f_S}{2}(t - \varepsilon T_S)\right)$$

The mathematical relationship for the signal $v(t)$ at the output of the pre-filter 10 can be described, using the combinations in equations (30) and (31), according to equation (32):

$$R(t) = \sum_{n=-\infty}^{+\infty} a_R(n) \cdot h_{GES0}(t - \varepsilon T_S - nT_S) \cdot (-1)^n \qquad (30)$$

$$I(t) = \sum_{n=-\infty}^{+\infty} a_I(n) \cdot h_{GES0}(t - \varepsilon T_S - nT_S) \cdot (-1)^n \qquad (31)$$

$$v(t) = [R(t) + j \cdot I(t)] \cdot \cos\left(2\pi \frac{f_S}{2}(t - \varepsilon T_S)\right) \cdot e^{j(2\pi \Delta f t + \Delta \varphi)} \qquad (32)$$

The in-phase and quadrature components of the signal $v(t)$ are respectively squared and then added in the modulus squarer 11, so that a signal $q(t)$ is provided at the output of the modulus squarer according to equation (33):

$$q(t) = [R^2(t) + I^2(t)] \cdot \cos^2\left(2\pi \frac{f_S}{2}(t - \varepsilon T_S)\right) = \qquad (33)$$

$$= \sum_{n=-\infty}^{+\infty} (a_R^2(n) + a_I^2(n)) \cdot h_{GES0}^2(t - \varepsilon T_S - nT_S) \cdot \cos^2\left(2\pi \frac{f_S}{2}(t - \varepsilon T_S)\right)$$

The signal $q(t)$ is then averaged in an averaging filter 12 consisting of a total of N−1 series-connected timing steps $13_1$, $13_2$, ..., $13_{N-1}$, of which the outputs are supplied together with the input of the first timing step $13_1$ to an adder 14 for summation of the signals $q_m(t)$ respectively time-delayed by a different number m of symbol lengths $T_s$. The output signal $m(t)$ of the averaging filter 12 can be obtained by convolution of the signal $q(t)$ with the impulse response $h_M(t)$ of the averaging filter 12 shown in equation (34) according to equation (35):

$$h_M(t) = \sum_{m=0}^{N-1} \delta(t - mT_S) \qquad (34)$$

-continued $$m(t) = q(t) * h_M(t) = \qquad (35)$$

$$= \sum_{m=0}^{N-1} [R^2(t - mT_S) + I^2(t - mT_S)] \cdot \cos^2\left(2\pi \frac{f_S}{2}(t - \varepsilon T_S - mT_S)\right)$$

Finally, in the subsequent maximum detector 15, the maximum of the averaged, modulus-squared, pre-filtered received signal $e(t)$ is determined, which corresponds according to equation (20) to the maximum of the log-likelihood function $l(\varepsilon)$ and therefore corresponds to the desired timing offset $\varepsilon$ of the clock-pulse synchronization.

The mathematical relationship in equation (36), in which the quadrature component is phase-displaced by one half symbol length $T_s$ by comparison with the in-phase component, is obtained for the clock-pulse synchronization of an offset QPSK signal $S_{OQPSK}(t)$ with reference to equation (1) for a PAM-, QPSK- or π/4-QPSK-signal:

$$S_{OQPSK}(t) = \qquad (36)$$

$$\sum_{n=-\infty}^{+\infty} a_R(n) \cdot \delta(t - nT_S) + j \cdot \sum_{n=-\infty}^{+\infty} a_I(n) \cdot \delta\left(t - \frac{T_S}{2} - nT_S\right)$$

The offset QPSK-modulated transmission signal in the baseband $S_{OQPSK}(t)$, in which the timing offset $\varepsilon$ of the clock-pulse signal, the convolution with the impulse response $h_s(t)$ of the transmitter filter 3 and the existing frequency and phase offset $\Delta f$ and $\Delta \phi$ of the carrier signal are already taken into consideration, is described, with reference to equation (8) for a PAM-, QPSK- or π/4-QPSK-signal, by equation (37):

$$S_{OQPSKNF}(t) = \qquad (37)$$

$$\left[ \sum_{n=-\infty}^{+\infty} a_R(n) \cdot h_S(t - \varepsilon T_S - nT_S) + j \cdot \sum_{n=-\infty}^{+\infty} a_I(n) \cdot h_S\left(t - \varepsilon T_S - \frac{T_S}{2} - nT_S\right) \right] \cdot e^{j(2\pi \Delta f t + \Delta \varphi)}$$

If the transmission system 1 is impressed with an offset-QPSK signal $S_{OQPSK}(t)$, the output signal $V_{OQPSK}(t)$ of the pre-filter 10 corresponding to equation (36) can once again be derived from the mathematical relationship in equation (28) for the output signal $v(t)$ of the pre-filter 10 in the case of a PAM-, QPSK- or π/4-QPSK-signal $s(t)$, and this is presented in equation (38):

$$v_{OQPSK}(t) = \qquad (38)$$

$$\left[ \sum_{n=-\infty}^{+\infty} a_R(n) \cdot h_{GES}(t - \varepsilon T_S - nT_S) + j \cdot \sum_{n=-\infty}^{+\infty} a_I(n) \cdot h_{GES}\left(t - \varepsilon T_S - \frac{T_S}{2} - nT_S\right) \right] \cdot e^{j(2\pi \Delta f t + \Delta \varphi)}$$

By analogy with the impulse response $$h_{GES}\left(t - \varepsilon T_S - \frac{T_S}{2} - nT_S\right)$$

in equation (29), the mathematical relationship in equation (39) can be determined for the impulse response $h_{GES}(t-\varepsilon T_S - nT_S)$:

$$h_{GES}\left(t - \varepsilon T_S - \frac{T_S}{2} - nT_S\right) = \qquad (39)$$

$$h_{GES0}\left(t - \varepsilon T_S - \frac{T_S}{2} - nT_S\right) \cdot$$

$$(-1)^n \cdot \sin\left(2\pi\frac{f_S}{2}(t - \varepsilon T_S)\right)$$

The combinations in equations (40) and (41) can be listed on the basis of the mathematical terms in equations (29) and (39), and the mathematical relationship for the output signal $V_{OQPSK}(t)$ of the pre-filter 10 in the event of an excitation of the transmission system 1 with an offset QPSK signal $S_{OQPSK}(t)$ from equation (38) can be transferred according to equation (42):

$$R_{OQPSK}(t) = \sum_{n=-\infty}^{+\infty} a_R(n) \cdot h_{GES0}(t - \varepsilon T_S - nT_S) \cdot (-1)^n \qquad (40)$$

$$I_{OQPSK}(t) = \sum_{n=-\infty}^{+\infty} a_I(n) \cdot h_{GES0}\left(t - \varepsilon T_S - \frac{T_S}{2} - nT_S\right) \cdot (-1)^n \qquad (41)$$

$$v_{OQPSK}(t) = \left[R_{OQPSK}(t) \cdot \cos\left(2\pi\frac{f_S}{2}(t - \varepsilon T_S)\right) + \qquad (42)\right.$$

$$\left. j \cdot I_{OQPSK}(t) \cdot \sin\left(2\pi\frac{f_S}{2}(t - \varepsilon T_S)\right)\right] \cdot e^{j(2\pi\Delta ft + \Delta\phi)}$$

If the output signal $V_{OQPSK}(t)$ of the pre-filter 10 were to be supplied to a modulus squarer 11, in the event of an excitation of the transmission system 1 with an offset QPSK signal $S_{OQPSK}(t)$ in the subsequent stage, as in the case of the conventional approach, for a PAM-, QPSK- or $\pi/4$-QPSK-signal, a signal $q_{OQPSK}(t)$ would be obtained at the output of the modulus squarer 11 according to equation (43):

$$q_{OQPSK}(t) = \left[R^2_{OQPSK}(t) \cdot \cos^2\left(2\pi\frac{f_S}{2}(t - \varepsilon T_S)\right) + \qquad (43)\right.$$

$$\left. I^2_{OQPSK}(t) \cdot \sin^2\left(2\pi\frac{f_S}{2}(t - \varepsilon T_S)\right)\right].$$

The mathematical relationship of the signal $q_{OQPSK}(t)$ from equation (43) is transferred, taking into consideration the combinations $R_{OQPSK}(t)$ and $I_{OQPSK}(t)$, into the expected value $E\{q_{OQPSK}(t)\}$ of the signal $q_{OQPSK}(t)$ in equation (44). In this context, the trigonometrical relationship $\sin(x)=\cos(x-\pi/2)$ and the fact that the symbol alphabet of offset QPSK signals contains only the values $\{\pm 1\}$, which do not correlate with one another over the individual sampling timing points $nT_s$, are exploited. In view of the absence of correlation, the individual products $a_R(m \cdot T_s) \cdot a_R(n \cdot T_s)$ and respectively $a_I(m \cdot T_s) \cdot a_I(n \cdot T_s)$ at different sampling timing points $m \cdot T_s$ and respectively $n \cdot T_s$ cancel each other out, while the products $a_R^2(m \cdot T_s)$ and respectively $a_I^2(n \cdot T_s)$ at the same sampling timing point $m \cdot T_s$ each provide the value +1.

$$E\{q_{OQPSK}(t)\} = \left[\sum_{n=-\infty}^{+\infty} h^2_{GES0}(t - \varepsilon T_S - nT_S) \cdot \qquad (44)\right.$$

$$\cos^2\left(2\pi\frac{f_S}{2}(t - \varepsilon T_S)\right) + \sum_{n=-\infty}^{+\infty} h^2_{GES0}$$

$$\left(t - \varepsilon T_S - \frac{T_S}{2} - nT_S\right) \cdot \cos^2$$

$$\left.\left(2\pi\frac{f_S}{2}\left(t - \varepsilon T_S - \frac{T_S}{2}\right)\right)\right].$$

As can easily be recognized, by introducing an auxiliary function $$w(t - nT_S) = h^2_{GES0}(t - \varepsilon T_S - nT_S) \cdot \cos^2\left(2\pi\frac{f_S}{2}(t - \varepsilon T_S)\right),$$

the equation (44) can be transferred for the signal $E\{q_{OQPSK}(t)\}$ according to equation (45):

$$E\{q_{OQPSK}(t)\} = \sum_{n=-\infty}^{+\infty} w(t - nT_S) + w\left(t - \frac{T_S}{2} - nT_S\right) \qquad (45)$$

Since for all n, the respective auxiliary function $w(t-nT_s)$ is restricted to the range $$n \cdot T_S - \frac{T_S}{2} \leq t - \varepsilon T_S \leq n \cdot T_S + \frac{T_S}{2}$$

and is an even function at the timing point $t - \varepsilon T_S = n \cdot T_S$; and at the same time, for all n, the respective auxiliary function $$w\left(t - \frac{T_S}{2} - nT_S\right)$$

is restricted to the range $$n \cdot T_S \leq t - \varepsilon T_S \leq 2 \cdot n \cdot T_S$$

and is an even function at the timing point $$t - \varepsilon T_S = n \cdot T_S + \frac{T_S}{2},$$

a constant function is obtained for the anticipated value $E\{q_{OQPSK}(t)\}$ of the signal $q_{OQPSK}(t)$ according to equation

(46) by the superposition of all auxiliary functions $w(t-nT_S)$ and $$w\left(t - \frac{T_S}{2} - nT_S\right).$$

Accordingly, a determination of the timing offset $\epsilon$ of the clock-pulse synchronization of an offset QPSK-modulated signal is not possible according to the conventional approach.

$$E\{q_{OQPSK}(t)\}=\text{const.} \tag{46}$$

Figure 5:
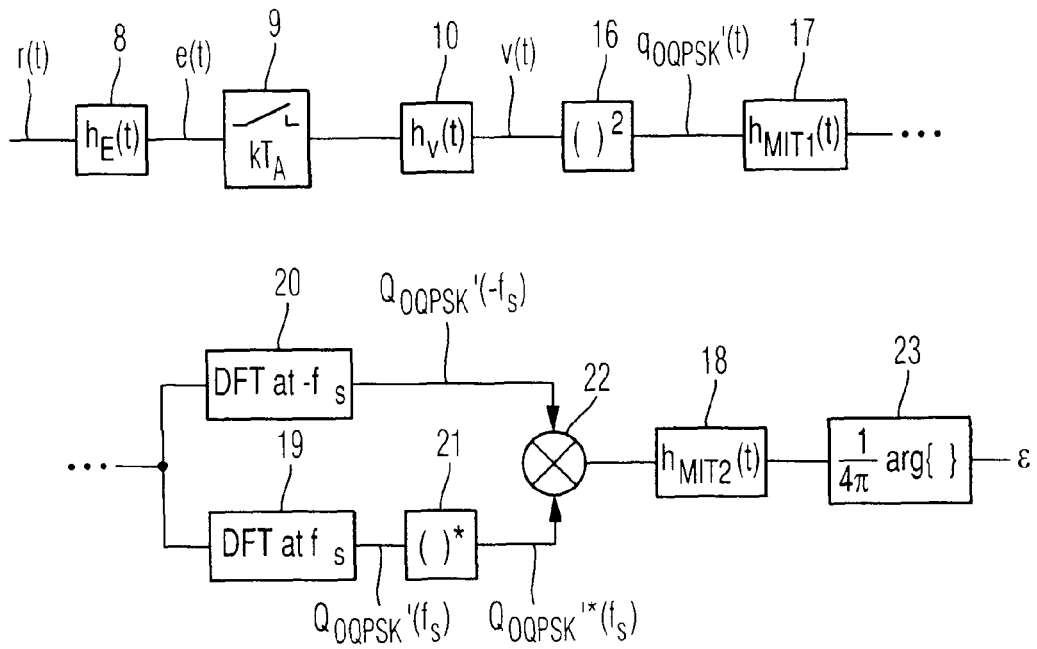
FIG. 5 shows a block-circuit diagram of an exemplary embodiment of the device according to an exemplary embodiment of the invention for clock-pulse synchronization with an offset QPSK signal.

However, according to an exemplary embodiment of the invention, if a pure squaring without modulus formation is implemented instead of a modulus squaring of the output signal v(t) of the pre-filter 10, starting from equation (42), after a pure squarer 16 in a first embodiment of the device according to an exemplary embodiment of the invention for clock-pulse synchronization of an offset QPSK-modulated signal shown in FIG. 5, the mathematical relationship in equation (47) is obtained for the output signal $q_{OQPSK}'(t)$:

$$q'_{OQPSK}(t) = \begin{bmatrix} R^2_{OQPSK}(t) \cdot \cos^2\left(2\pi\frac{f_S}{2}(t-\varepsilon T_S)\right) - I^2_{OQPSK}(t) \cdot \sin^2\left(2\pi\frac{f_S}{2}(t-\varepsilon T_S)\right) + \\ j \cdot 2 \cdot R_{OQPSK}(t) \cdot I_{OQPSK}(t) \cdot \cos\left(2\pi\frac{f_S}{2}(t-\varepsilon T_S)\right) \cdot \sin\left(2\pi\frac{f_S}{2}(t-\varepsilon T_S)\right) \end{bmatrix} \cdot e^{j2(2\pi\Delta ft+\Delta\varphi)} \tag{47}$$

Using the relationships $$\cos(x) = \frac{1}{2}(e^{jx} + e^{-jx}) \text{ and } \sin(x) = \frac{1}{2j}(e^{jx} - e^{-jx})$$

the mathematical relationship for the signal $q_{OQPSK}'(t)$ in equation (47) can be transferred according to equation (48).

$$q'_{OQPSK}(t) = \begin{bmatrix} \frac{1}{4}(R_{OQPSK}(t) + I_{OQPSK}(t))^2 \cdot e^{j(2\pi f_S(t-\varepsilon T_S))} + \\ \frac{1}{4}(R_{OQPSK}(t) - I_{OQPSK}(t))^2 \cdot e^{-j(2\pi f_S(t-\varepsilon T_S))} + \\ \frac{1}{2}(R^2_{OQPSK}(t) - I^2_{OQPSK}(t)) \end{bmatrix} \cdot e^{j2(2\pi\Delta ft+\Delta\varphi)} \tag{48}$$

The signal $q_{OQPSK}'(t)$ represents a superposition of three periodic, rotating signal components with the respective frequency $f_s+\Delta f$, $-f_s+\Delta f$ and $\Delta f$. By contrast with the expected value $E\{q_{OQPSK}(t)\}$ of the signal $q_{OQPSK}(t)$ discussed above, the signal $q_{OQPSK}'(t)$ represents a periodic signal, which contains a discrete spectral pair at $\pm f_s+2\cdot\Delta f$, of which the phase can be determined and provides the desired timing offset $\epsilon$ for the clock-pulse synchronization of an offset QPSK-modulated signal.

The mathematical relationship for the signal $q_{OQPSK}'(t)$ in equation (48) can be further simplified by resolving the combinations $R_{OQPSK}^2(t)$ and $I_{OQPSK}^2(t)$:

In order to determine the expected value $E\{R_{OQPSK}^2(t)\}$ of the combination $R_{OQPSK}^2(t)$ and, by analogy, the anticipated value $E\{I_{OQPSK}^2(t)\}$ of the combination $I_{OQPSK}^2(t)$, the spectrum associated with the expected value $E\{R_{OQPSK}^2(t)\}$, of the combination $R_{OQPSK}^2(t)$ and with the expected value $E\{I_{OQPSK}^2(t)\}$ of the combination $I_{OQPSK}^2(t)$ is observed. By way of approximation, for the spectrum of the respective expected values $E\{R_{OQPSK}^2(t)\}$ and $E\{I_{OQPSK}^2(t)\}$, the respectively-associated modulus of the spectrum is used, which corresponds in each case to the convolution $|H_{GES0}(f)|*|H_{GES0}(f)|$ of the modulus $|H_{GES0}(f)|$ of a low-pass filter symmetrical with itself relative to the frequency f=0. Because of the band limitation of the low-pass filter at the level of $$|f| \leq \frac{f_s}{2},$$

the convolution result is band-limited to $|f|\leq f_s$, so that the spectrum of the respective expected values $E\{R_{OQPSK}^2(t)\}$ and $E\{I_{OQPSK}^2(t)\}$ is zero at all relevant frequencies $\pm i\cdot f_s$ (i: integer factor) with the exception of the direct component (i=0). The corresponding expected values $E\{R_{OQPSK}^2(t)\}$ of the combination $R_{OQPSK}^2(t)$ and $E\{I_{OQPSK}^2(t)\}$ of the combination $I_{OQPSK}^2(t)$ are therefore obtained, taking into consideration equations (40) and respectively (41), as a constant factor $c_0$, which corresponds to the modulus of the convolution result $(H_{GES0}(f)*H_{GES0}(f))|_{f=0}$ at the frequency zero.

For the expected values $E\{(R_{OQPSK}(t)+I_{OQPSK}(t))^2\}$ and $E\{(R_{OQPSK}(t)-I_{OQPSK}(t))^2\}$, the two convolutions $H_{GES0}'(f) *H_{GES0}'(f)$ and respectively $H_{GES0}''(f)*H_{GES0}''(f)$, which differ from the above convolution $H_{GES0}(f)*H_{GES0}(f)$ because of the addition and subtraction, are obtained in an exactly similar manner to the above considerations for the moduli of the associated spectra. In this context also, the convolutions are band-limited to $|f|\leq f_s$ because of the squaring, so that the spectra of the expected values $E\{(R_{OQPSK}(t)+I_{OQPSK}(t))^2\}$ and $E\{(R_{OQPSK}(t)-I_{OQPSK}(t))^2\}$ are zero at the frequencies $\pm i\cdot f_s$ with the exception of the direct component (i=0). The corresponding expected values $E\{(R_{OQPSK}(t)+I_{OQPSK}(t))^2\}$ and $E\{(R_{OQPSK}(t)-I_{OQPSK}(t))^2\}$ are therefore obtained as constant values $c_0'$ and $c_0'$.

Accordingly, starting from equation (48) the mathematical relationship according to equation (49) is obtained for the expected value $E\{q_{OQPSK}'(t)\}$ of the signal $q_{OQPSK}'(t)$:

$$E\{q_{OQPSK}'(t)\}=[c_0'\cdot e^{j2\pi f_s(t-\varepsilon T_s)}+c_0'\cdot e^{-j2\pi f_s(t-\varepsilon T_s)}]\cdot e^{j2(2\pi\Delta ft+\Delta\phi)} \tag{49}$$

It is evident from equation (49) that the determination of the timing offset $\epsilon$ is reduced to a pure observation of phase. The mathematical relationships in equations (50) and (51) are obtained for the two phases $\phi_1$ and $\phi_2$ of the two complex signal components of the expected value $E\{q_{OQPSK}'(t)\}$ of the signal $q_{OQPSK}'(t)$ in equation (49) . The timing offset $\epsilon$ is obtained by subtraction of the phases $\phi_1$ and $\phi_2$ and subsequent scaling by the factor $1/4\pi$ as shown in equation (52):

$$\varphi_1 = -2\pi\varepsilon + 2\Delta\varphi \tag{50}$$

$$\varphi_2 = 2\pi\varepsilon + 2\Delta\varphi \tag{51}$$

$$\varepsilon == \frac{1}{4\pi}(-\varphi_1 + \varphi_2) \tag{52}$$

With reference to these mathematical principles, the following section describes the first embodiment of the device according to an exemplary embodiment of the invention for clock-pulse synchronization with an offset QPSK signal. In this context, identical reference numbers are used for functional units, which have not changed by comparison with the device for clock-pulse synchronization according to the conventional approach illustrated in FIG. 3.

The first embodiment of the device according to an exemplary embodiment of the invention for clock-pulse synchronization with an offset QPSK signal illustrated in FIG. 5 filters the received signal in a similar manner to the conventional approach as shown in FIG. 3 using a receiver filter 8 and samples it using a sampling and holding element 9 with an oversampling factor os. A pre-filtering in a signal-matched pre-filter 10 is also implemented. By contrast with the conventional approach, the output signal v(t) of the pre-filter 10 is then squared with a squarer 16 without modulus formation.

The squared and filtered received signal $q_{OQPSK}'(t)$ is then also averaged by analogy with the averaging filter 12 of the conventional approach shown in FIG. 3. In this context, according to an exemplary embodiment of the invention, the averaging is subdivided between a first averaging filter 17 with the impulse response $h_{MIT1}(t)$ and a second averaging filter 18 with the impulse response $h_{MIT2}(t)$ provided later in the signal path. The separation of the averaging into two averaging stages is justified by the fact that the two spectral lines of the squared, filtered received signal $q_{OQPSK}'(t)$, as illustrated by equation (50), are frequency displaced relative to the two symbol frequencies $\pm f_s$ by the frequency offset $2 \cdot \Delta f$ of the carrier signal. To ensure that these two spectral lines of the squared pre-filtered received signal $q_{OQPSK}'(t)$ are disposed within the pass range of the averaging filter, the bandwidth of the first averaging filter 17 is designed to be of an appropriate width.

The impulse response $h_{MIT1}(t)$ of the first averaging filter 17 is obtained by analogy with the impulse response $h_M(t)$ of the averaging filter in the conventional approach according to equation (34) from an averaging over a total of N symbols. The bandwidth of the first averaging filter 17, widened in view of the above considerations, leads to a shortened averaging length. In order to achieve the averaging length required for a given averaging quality in the device according to an exemplary embodiment of the invention, a second averaging filter 18 is introduced, which filters over a multiple of the averaging length of the first averaging filter 17, in total, I·N symbol lengths.

After the first averaging filter 17, in a first discrete Fourier transformer 19, the Fourier transform of the pre-filtered, squared and averaged received signal is determined at the frequency $f_s$. In a similar manner, in a second discrete Fourier transformer 20, the Fourier transform of the pre-filtered, squared and averaged received signal is calculated at the frequency $-f_s$. The Fourier transform of the pre-filtered, squared and averaged received signal at the frequency $f_s$ is conjugated in a subsequent conjugator 21 with regard to its phase. Finally, the conjugated Fourier transform of the pre-filtered, squared and averaged received signal at the frequency $f_s$ is multiplied in a multiplier 22 by the Fourier transform of the pre-filtered, squared and averaged received signal at the frequency $-f_s$.

The multiplier 22 is followed by the second averaging filter 18, mentioned above, with the impulse response $h_{MIT2}(t)$ according to equation (54).

$$h_{MIT2}(t) = \sum_{i=0}^{l-1} \delta(t - i \cdot N \cdot T_S) \tag{54}$$

The second averaging filter 18 is used for further interference removal.

In the final signal-processing unit 23, the timing offset $\epsilon$ is determined by argument formation in the sense of equation (53); determination of the phase of the Fourier transforms of the pre-filtered, squared and averaged received signal $q_{OQPSK}'(t)$ at the two frequencies $\pm f_s$ multiplied by one another; and scaling by the factor $1/4\pi$.

Figure 6:
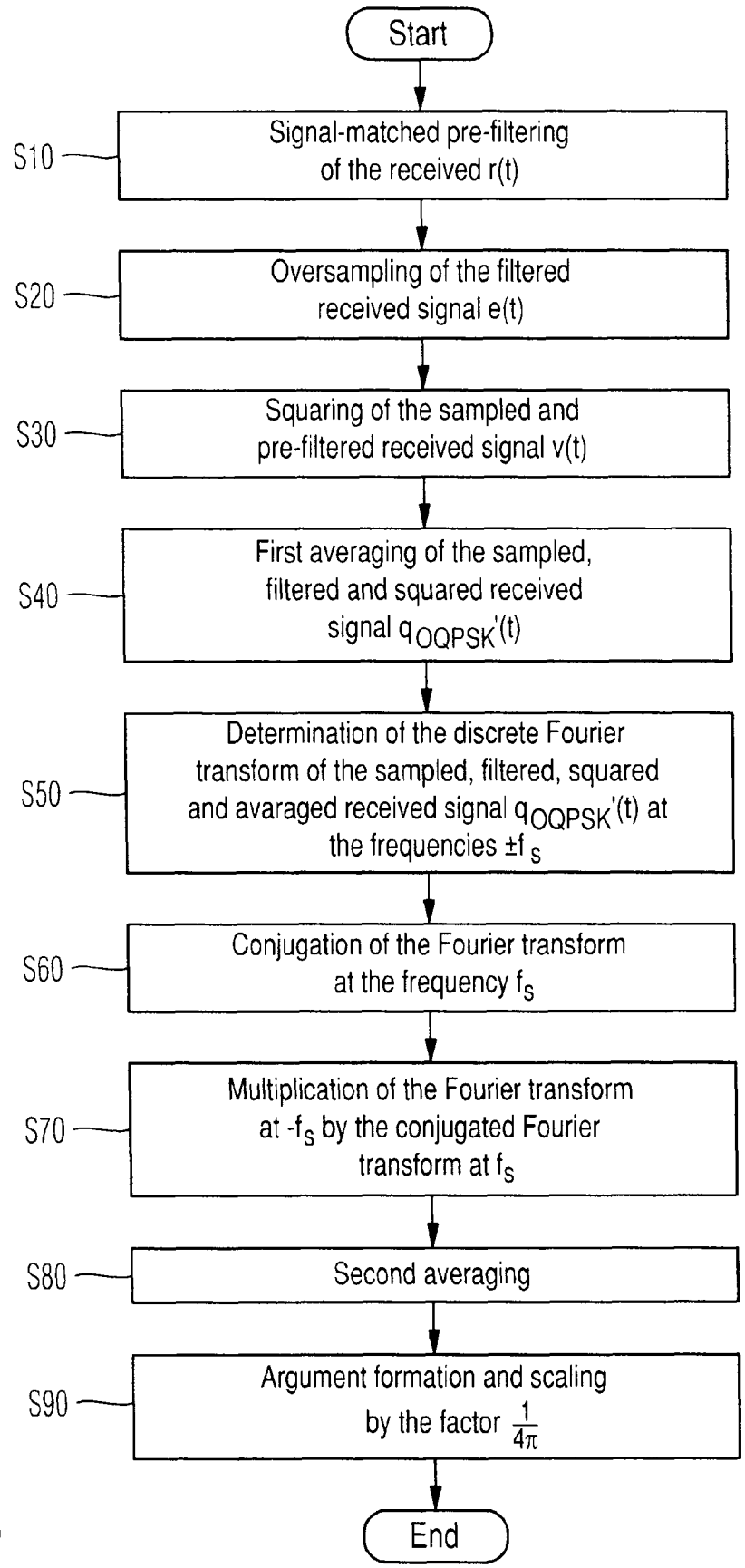
FIG. 6 shows a flow chart of a process performed by the device of FIG. 5 according to an exemplary embodiment of the invention for clock-pulse synchronization with an offset QPSK signal.

In procedural stage S10, as shown in FIG. 6, the associated first embodiment of the method according to an exemplary embodiment of the invention for clock-pulse synchronization with an offset QPSK signal implements a signal-matched filtering of the received signal r(t) in a receiver filter 8 according to equations (21) and (22) and subsequent pre-filtering in a pre-filter 10. This filter according to equation (25) with its equidistant zero crossings according to equation (27) is absolutely necessary for asymptotic (SNR=$\infty$), error-free estimated values of the timing offset $\epsilon$.

In the next procedural stage S20, the filtered received signal e(t) is oversampled in a sampling and holding element 9 with an oversampling factor os of 8 in order to satisfy the Nyquist condition by frequency doubling of the received signal on the basis of squaring and multiplication.

In the next procedural stage S30, the filtered and sampled received signal is squared in a squarer 16.

In the next procedural stage S40, the filtered, sampled and squared received signal $q_{OQPSK}'(t)$ is averaged in a first averaging filter 17 according to equation (34) over a total of N symbol lengths.

The next procedural stage S50 provides a determination of the discrete Fourier transform $Q_{OQPSK}'(f)$ respectively at the frequencies $\pm f_s$ in the first and second discrete Fourier transformer 19 and 20.

The conjugation of the discrete Fourier transforms $Q_{OQPSK}'(f_s)$ at the frequency $f_s$ is implemented in the next procedural stage S60 in a conjugator 21.

In the next procedural stage S70, the conjugated Fourier transform $Q_{OQPSK}'^*(f_s)$ at the frequency $f_s$ is multiplied by the Fourier transform $Q_{OQPSK}'(-f_s)$ at the frequency $-f_s$ in a multiplier 22.

The second averaging of the two Fourier transforms $Q_{OQPSK}'^*(f_s)$ and $Q_{OQPSK}'(-f_s)$ multiplied by one another over a total of I·N symbol lengths is implemented in the next procedural stage S80 in a second averaging filter 18.

In the final procedural stage S90, the argument of the two Fourier transforms $Q_{OQPSK}'^*(f_s)$ and $Q_{OQPSK}'(-f_s)$, multiplied by one another and averaged, is determined, and after this, a scaling by a scaling factor $1/4\pi$ is implemented in order to determine the timing offset $\epsilon$.

Figure 7:
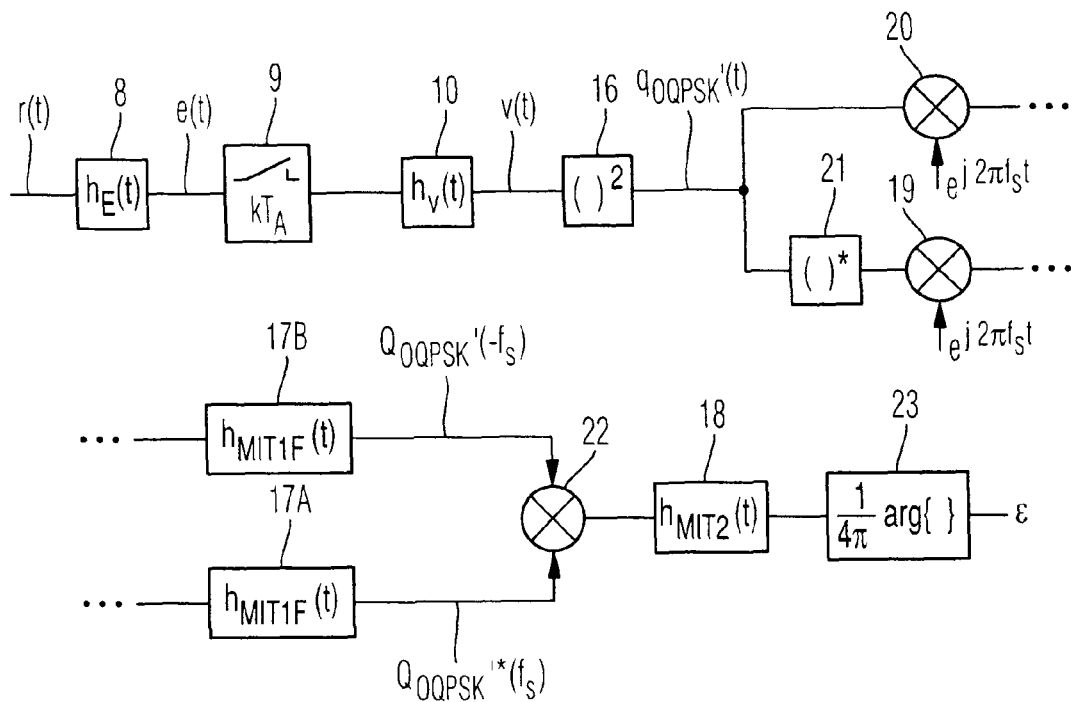
FIG. 7 shows a block-circuit diagram of an alternative embodiment of the device according to an exemplary embodiment of the invention for clock-pulse synchronization with an offset QPSK signal, according to an exemplary embodiment.

FIG. 7 shows a second embodiment of the device according to an exemplary embodiment of the invention for clock-pulse synchronization with an offset QPSK-modulated signal. Functional units identical to those in the first embodiment shown in FIG. 5 are marked with the same reference numbers.

The second embodiment of the device according to an exemplary embodiment of the invention for clock-pulse synchronization with an offset QPSK-modulated signal in FIG. 7 is identical to the first embodiment shown in FIG. 5 in its functional structure within the signal path up to the squarer 16. Following this, in the second embodiment, by contrast with the first embodiment, the averaging in the first averaging filter is exchanged with the discrete Fourier transformation in the first and second discrete Fourier transformer including the conjugation in the conjugator.

Accordingly, the squarer 18 is followed by a conjugator 21 for the conjugation of the filtered, sampled and squared received signal $q_{OQPSK}'(t)$, and following this, a first discrete Fourier transformer 19 for the implementation of the discrete Fourier transformation on the filtered, sampled, squared and conjugated received signal $q_{OQPSK}'(t)$ at the frequency $f_s$, and parallel to this, a second discrete Fourier transformer 20 for the implementation of the discrete Fourier transformation on the filtered sampled and squared received signal $q_{OQPSK}'(t)$ at the frequency $-f_s$.

In the second embodiment, the first averaging filter 17 of the first embodiment is series-connected as a first averaging filter 17A and respectively 17B to the first and second discrete Fourier transformers 19 and 20 in order to implement the first averaging of the two discrete Fourier transforms $Q_{OQPSK}'^*(f_s)$ and $Q_{OQPSK}'(-f_s)$.

The further functional structure in the signal path of the second embodiment is the same as the functional structure of the first embodiment.

Figure 8:
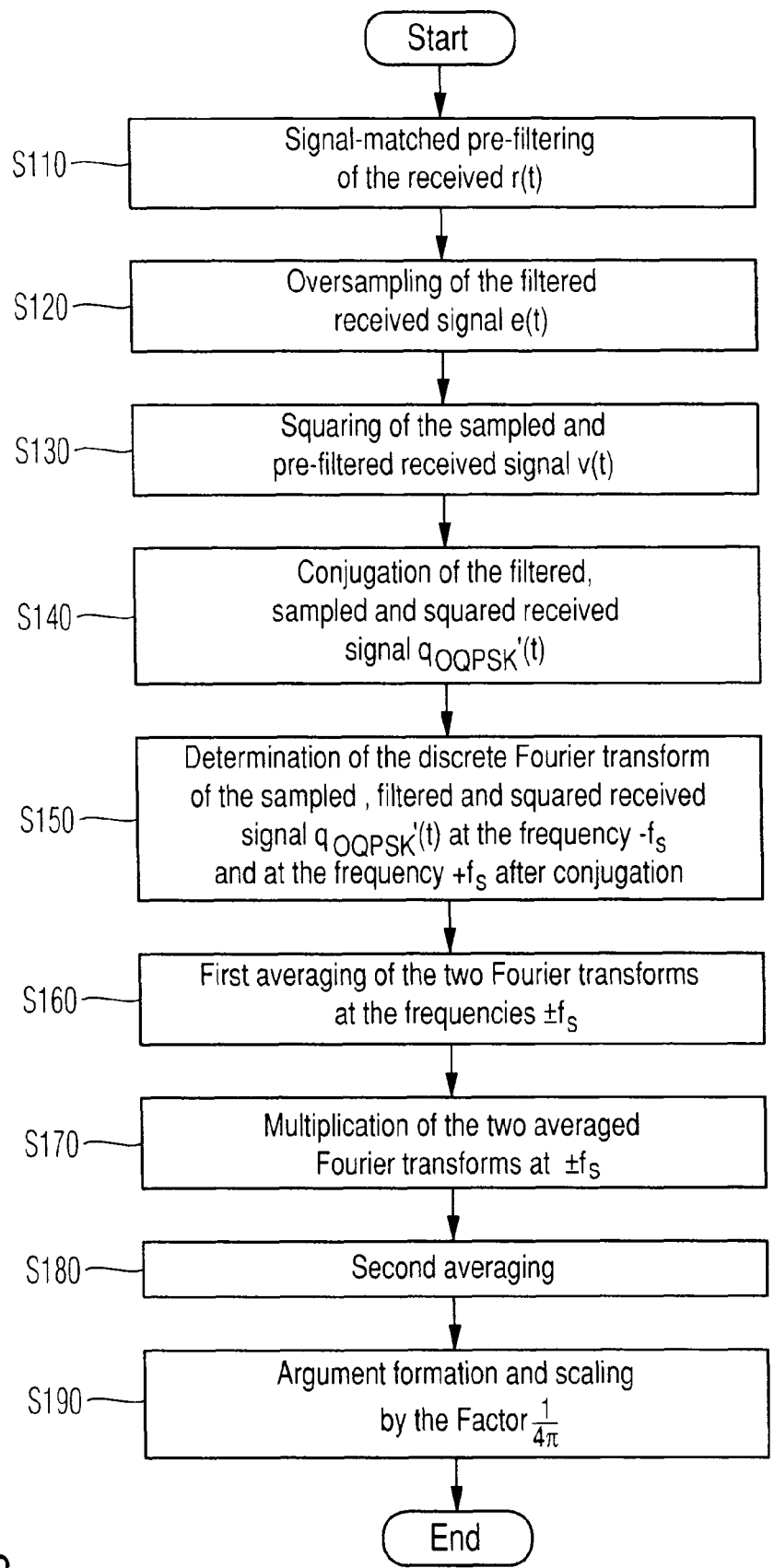
FIG. 8 shows a flow chart of a process performed by the device of FIG. 7 according to an exemplary embodiment of the invention for clock-pulse synchronization with an offset QPSK signal, according to an exemplary embodiment.

FIG. 8 shows a flow chart of the associated method according to an exemplary embodiment of the invention for clock-pulse synchronization with an offset QPSK-signal. As shown in FIG. 8, procedural stages S110 to S130 and S170 to S190 of the second embodiment are the same as the corresponding procedural stages S10 to S30 and S70 to S90 of the first embodiment illustrated in FIG. 6 and are therefore not explained in greater detail.

In procedural stage S140 of the second embodiment of the method according to an exemplary embodiment of the invention, the filtered, sampled and squared received signal $q_{OQPSK}'(t)$ is conjugated in a conjugator 21.

In the next procedural stage S150, the discrete Fourier transforms $Q_{OQPSK}'^*(f_s)$ at the frequency $f_s$ and $Q_{OQPSK}'(-f_s)$ at the frequency $-f_s$ are calculated in a first and second discrete Fourier transformer 19 and 20 from the conjugated, filtered, sampled and squared received signal $q_{OQPSK}'(t)$ and the un-conjugated, filtered, sampled and squared received signal $q_{OQPSK}'(t)$.

In the next procedural stage S160, the first averaging of the two discrete Fourier transforms $Q_{OQPSK}'^*(f_s)$ at the frequency $f_s$ and $Q_{OQPSK}'(-f_s)$ at the frequency $-f_s$ is implemented respectively with a first averaging filter 17A and 17B according to equation (34).

In procedural stage S170, the multiplication of the averaged discrete Fourier transforms $Q_{OQPSK}'^*(f_s)$ at the frequency f, and $Q_{OQPSK}'(-f_s)$ at the frequency $-f_s$ is implemented in exactly the same manner as in the first embodiment of the method according to an exemplary embodiment of the invention. Reference is therefore made to the description above relating to the first embodiment for an explanation of the further procedural stages.

The invention is not restricted to the embodiment presented. In particular, the invention covers advanced, time-domain-orientated measurement methods for the timing offset ε of the clock-pulse synchronization of an offset QPSK-modulated signal, which contain the inventive idea presented above.

The invention claimed is:

1. A method for clock-pulse synchronization between an amplitude-modulated or phase-modulated received signal (r(t)) and a transmitted signal (s(t)), the method comprising:
    estimating a timing offset (ε) between the received signal (r(t)) and the transmitted signal (s(t)) by maximum-likelihood estimation, wherein the maximum-likelihood estimation is realized through a pre-filtering dependent upon a transmission characteristic, a subsequent nonlinear signal-processing function and an averaging filtering,
    wherein the received signal (r(t)) is an offset quadrature-phase-modulated received signal, and the nonlinear signal-processing function maintains alternating components in a spectrum of a pre-filtered offset quadrature-phase-modulated received signal (v(t)).

2. A method for clock-pulse synchronization according to claim 1, wherein the nonlinear signal-processing function is a squaring without modulus-formation.

3. A method for clock-pulse synchronization according to claim 2, wherein the squaring without modulus-formation realizes a superposition of the squared real and imaginary component of the pre-filtered offset quadrature-phase-modulated received signal (v(t)) maintaining the alternating component in the spectrum of the pre-filtered offset quadrature-phase-modulated received signal (v(t)).

4. A method for clock-pulse synchronization according to claim 1, wherein a Fourier-transform ($Q_{OQPSK}'(f)$) of the pre-filtered and squared offset quadrature-phase-modulated received signal ($q_{OQPSK}'(t)$) is determined respectively at the positive and negative symbol frequency ($\pm f_s$).

5. A method for clock-pulse synchronization according to claim 4, wherein the Fourier transform ($Q_{OQPSK}'(f)$) of the pre-filtered and squared offset quadrature-phase-modulated received signal ($q_{OQPSK}'(t)$) is conjugated at the positive symbol frequency ($f_s$) and then multiplied by the Fourier transform ($q_{OQPSK}'(-f_s)$) of the pre-filtered and squared offset quadrature-phase-modulated received signal ($q_{OQPSK}'(t)$) at the negative symbol frequency ($-f_s$).

6. A method for clock-pulse synchronization according to claim 1, wherein the averaging filtering includes a first averaging filtering and a second averaging filtering.

7. A method for clock-pulse synchronization according to claim 6, wherein the bandwidth of the first averaging filtering is increased until the spectral line of the pre-filtered and squared offset quadrature-phase-modulated received signal ($q_{OQPSK}'(t)$) displaced respectively by the frequency offset ($2 \cdot \Delta f$) of the carrier frequency relative to the positive and negative symbol frequency ($\pm f_s$) comes to be disposed within the pass range of the first averaging filtering.

8. A method for clock-pulse synchronization according to claim 6, wherein the first averaging filtering is implemented before the determination of the two Fourier transforms.

9. A method for clock-pulse synchronization according to claim 6, wherein the first averaging filtering is implemented respectively after the determination of the two Fourier transforms.

10. A method for clock-pulse synchronization according to claim 6, wherein the duration of the impulse response of the second averaging filtering is increased until the duration of the impulse response of the first averaging filtering, reduced by the increased bandwidth, in combination with the duration of the impulse response of the second averaging filtering leads to a total duration required in order to smooth interference superposed on the pre-filtered and squared offset quadrature-phase-modulated received signal ($q_{OQPSK}'(t)$).

11. A method for clock-pulse synchronization according to claim 6, wherein the second averaging filtering is implemented after the multiplication of the conjugated Fourier transform ($Q_{OQPSK}'^*(f_s)$) at the positive symbol frequency ($f_s$) by the Fourier transform ($Q_{OQPSK}'(-f_s)$) at the negative symbol frequency ($-f_s$).

12. An apparatus for clock-pulse synchronization between an amplitude-modulated or phase-modulated received signal ($r(t)$) and a transmitted signal ($s(t)$) by estimating a timing offset ($\epsilon$) between the received signal ($r(t)$) and the transmitted signal ($s(t)$), the apparatus comprises:
- a maximum-likelihood estimator including a pre-filter dependent upon the transmission characteristic, a subsequent nonlinear signal-processing unit and an averaging filter,
- wherein the received signal ($r(t)$) is an offset quadrature-phase-modulated received signal, and the nonlinear signal-processing unit is a squarer without modulus former.

13. An apparatus for clock-pulse synchronization according to claim 12, wherein the averaging filter includes a first averaging filter and a second averaging filter connected downstream.

14. An apparatus for clock-pulse synchronization according to claim 13, wherein a first and a second discrete Fourier transformer for the implementation of the Fourier transformation at the positive and negative symbol frequency ($+f_s$, $-f_s$) are connected respectively between the squarer and the second averaging filter.

15. An apparatus for clock-pulse synchronization according to claim 14, wherein a conjugator is connected upstream or downstream of the first discrete Fourier transformer for the implementation of the Fourier transformation at the positive symbol frequency ($+f_s$).

16. An apparatus for clock-pulse synchronization according to claim 14, wherein the first averaging filter is connected upstream of the first and second discrete Fourier transformers.

17. An apparatus for clock-pulse synchronization according to claim 14, wherein a first averaging filter is connected respectively downstream of the first and second discrete Fourier transformer.

18. An apparatus for clock-pulse synchronization according to claim 16, wherein a multiplier is connected downstream of the first and second discrete Fourier transformer or the two first averaging filters for the multiplication of the conjugated Fourier transform ($Q_{OQPSK}'^*(f_s)$) of the pre-filtered and squared offset quadrature-phase-modulated received signal ($q_{OQPSK}'(t)$) at the positive symbol frequency ($+f_s$) by the Fourier transform ($Q_{OQPSK}'(-f_s)$) of the pre-filtered and squared offset quadrature-phase-modulated received signal ($q_{OQPSK}'(t)$) at the negative symbol frequency ($-f_s$).

* * * * *